United States Patent
Della Putta et al.

(10) Patent No.: US 6,953,061 B2
(45) Date of Patent: Oct. 11, 2005

(54) PROTECTIVE SLEEVE FOR FLUID CIRCULATION TUBE

(75) Inventors: Lucia Della Putta, Compiegne (FR); Hubert Andrieu, Crepy en Valois (FR); Lionel Dromain, Crepy en Valois (FR)

(73) Assignee: Federal Mogul Systems Protection Group, Crepy-en-Valois (FR)

( * ) Notice: Subject to any disclaimer, the term of this patent is extended or adjusted under 35 U.S.C. 154(b) by 0 days.

(21) Appl. No.: 10/495,786

(22) PCT Filed: Nov. 15, 2002

(86) PCT No.: PCT/FR02/03916

§ 371 (c)(1),
(2), (4) Date: May 17, 2004

(87) PCT Pub. No.: WO03/044420

PCT Pub. Date: May 30, 2003

(65) Prior Publication Data

US 2005/0011569 A1 Jan. 20, 2005

(30) Foreign Application Priority Data

Nov. 21, 2001 (FR) .............................. 01 15059

(51) Int. Cl.[7] ................................ F16L 11/00

(52) U.S. Cl. ..................... 138/110; 138/156; 138/151; 138/128; 138/127; 138/174

(58) Field of Search ................................ 138/110, 156, 138/151, 128, 123, 127, 174, DIG. 8; 206/449

(56) References Cited

U.S. PATENT DOCUMENTS 3,885,593 A   5/1975   Koerber et al. ............. 138/128
5,849,379 A   12/1998  Brushafer et al. ......... 428/35.8

FOREIGN PATENT DOCUMENTS

WO   WO 99 04194   1/1999
WO   WO 00 46543   8/2000

*Primary Examiner*—Patrick Brinson
(74) *Attorney, Agent, or Firm*—Young & Thompson

(57) ABSTRACT

The invention concerns a protective sleeve for fluid circulation tube made of an interwoven fiber structure formed by a strip (10) of interwoven fibers comprising at least a pocket (11) extending in the transverse direction of the strip (10) and including a spring (13) housed in the pocket (11) and designed, in a stable equilibrium position, to maintain the protective sheath closed by overlapping of the longitudinal edges (10c, 10d) of the strip. The invention is useful in particular for thermal protection of an exhaust gas recycling duct in a motor vehicle.

11 Claims, 3 Drawing Sheets

Fig.1
Fig.2
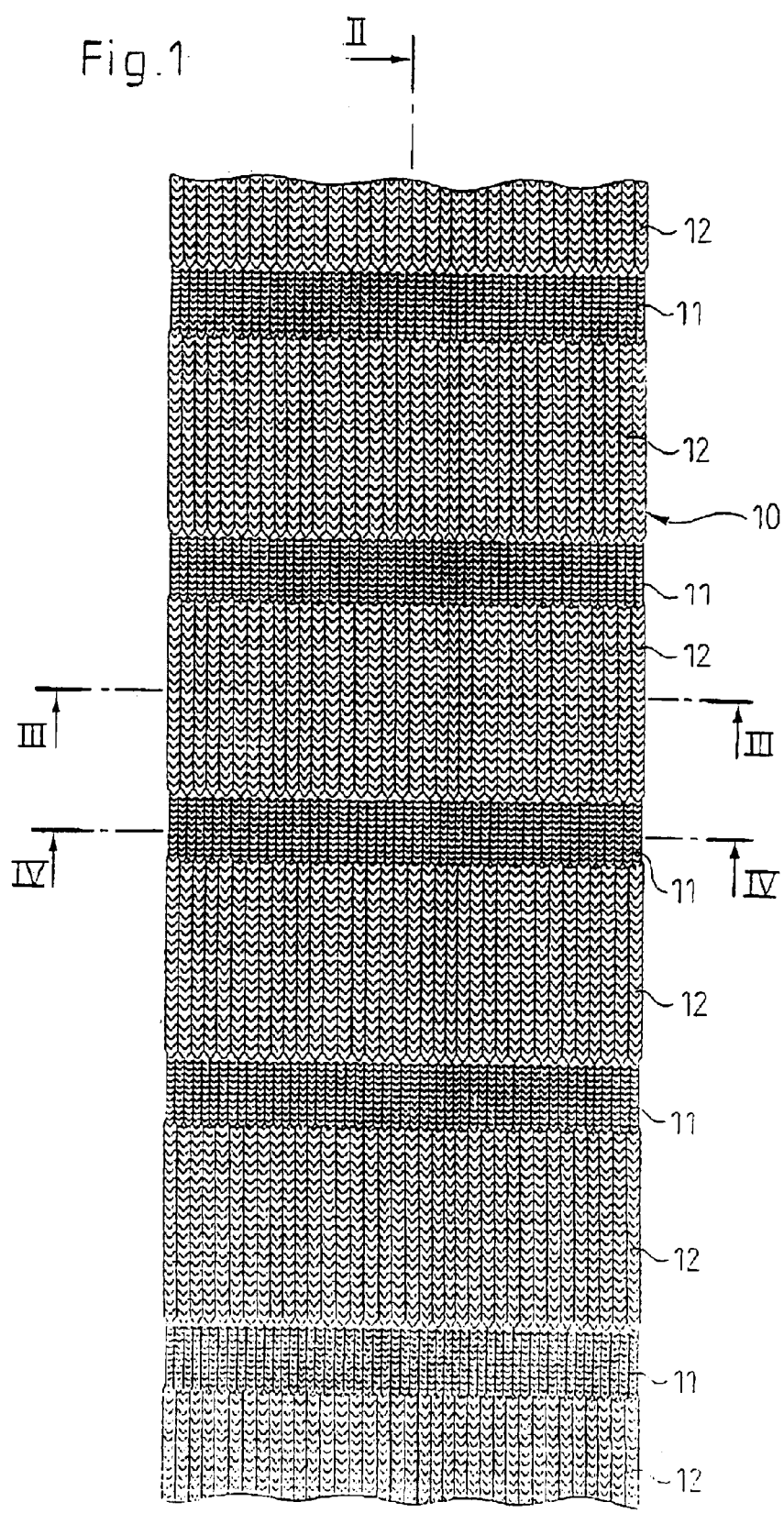
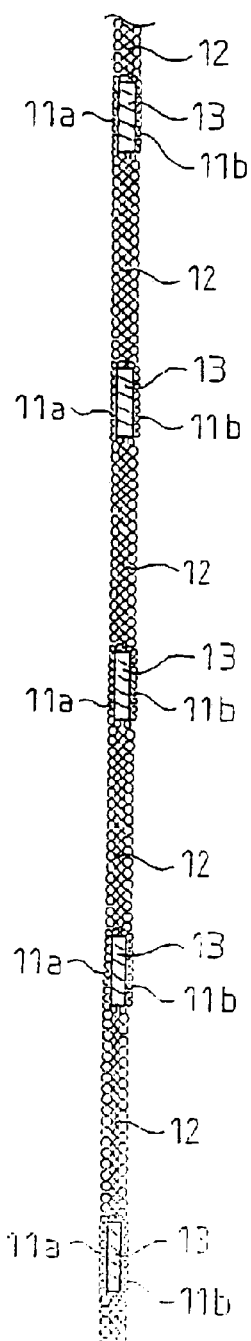

Fig. 3
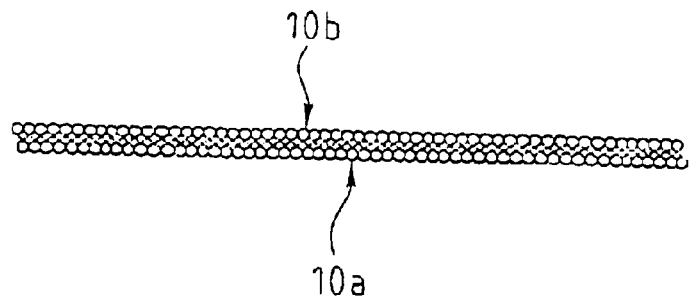
Fig. 4
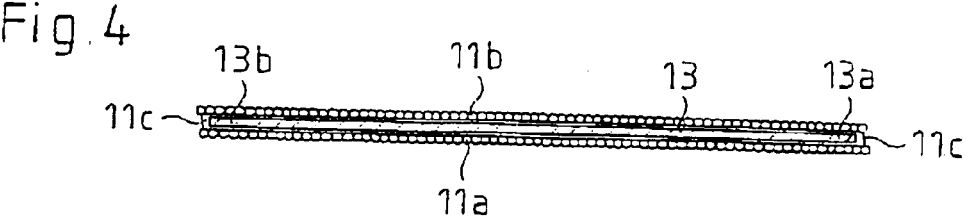
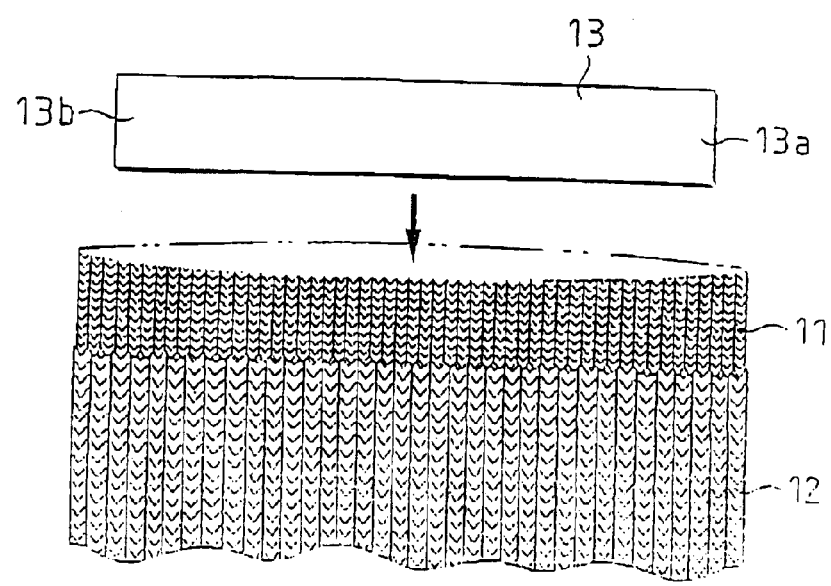
Fig. 7

PROTECTIVE SLEEVE FOR FLUID CIRCULATION TUBE

CROSS REFERENCE TO RELATED APPLICATION

This is the 35 USC 371 national stage of PCT/FR02/03916 filed on Nov. 15, 2002, which designated the United States of America.

FIELD OF THE INVENTION

The present invention relates to a protective sleeve for fluid circulation tubes.

It also relates to a method of fabricating this kind of protective sleeve.

BACKGROUND OF THE INVENTION

The general field of the invention is that of thermal protection of fluid pipes used, in particular, on automobile vehicles.

The present invention may be more particularly applied to exhaust gas recirculation (EGR) circuits of an automobile vehicle.

It is important to limit thermal losses from EGR pipes, as much to maintain the recirculated exhaust gas at a satisfactory temperature as to limit heating of surrounding items.

Thermally isolating these pipes by covering them with a braided or knitted sleeve of glass fibers or silica fibers adapted to withstand the high temperatures of the recirculation pipes, which are of the order of 400 to 500° C., is known in the art.

These protective sleeves may be tubular, in which case it is necessary to fit the sleeves over the pipes before connecting the pipes to the exhaust circuit as a whole. Furthermore, it is difficult to fit these tubular sleeves over portions of the pipes that are bent or have different cross sections.

There are also tubular sleeves slit along a longitudinal axis which, following heat treatment, are able to close up of their own accord with the longitudinal edges of the sleeve overlapping each other.

Flanges or fixing clips must then be fitted to hold the sleeve closed around the pipe to be protected.

These solutions are irksome to put into practice and fitting the protective sleeve to the pipe is relatively complicated.

SUMMARY OF THE INVENTION

The present invention aims to solve the problems cited hereinabove and proposes a protective sleeve for fluid circulation pipes that is particularly simple to fit, regardless of the curvature or the cross section of the pipes.

To this end, the first aspect of the present invention provides a protective sleeve for fluid circulation tubes comprising a structure of interlaced fibers.

According to the invention, said sleeve is formed of a strip of interlaced fibers comprising at least one pocket extending in the transverse direction of the strip, and it comprises a spring housed in said pocket and adapted, in a stable equilibrium position, to hold said protective sleeve closed by virtue of overlapping of longitudinal edges of the strip.

A completely novel sleeve structure made up of interlaced fibers is obtained in this way which comprises, in a transverse pocket, a spring adapted in a relaxed position to hold the longitudinal edges of the sleeve closed, overlapping each other.

Thus the sleeve may be fitted easily by spreading apart the edges by applying a force in the opposite direction to the elastic return force exerted by the spring, and then removing this force so that the spring in its equilibrium position holds the longitudinal edges of the strip one over the other, around the pipe.

A protective sleeve of this kind espouses different pipe shapes by virtue of the possibility of deformation of the spring.

Furthermore, because the sleeve is slit in its longitudinal direction, it can even be fitted when the pipe is connected to the exhaust system as a whole of an automobile vehicle.

Finally, the springs both close the protective sleeve and hold it in position on the pipe to be protected.

According to a preferred feature of the invention, the protective sleeve comprises a plurality of pockets spaced from each other in the longitudinal direction of the strip of interlaced fibers.

Thus pockets can be produced successively in the strip to hold it onto the pipe to be protected at various positions. These pockets may be equidistant from each other in the longitudinal direction of the sleeve.

The position of these pockets may be determined as a function of the length and the curvature of the pipe to be protected.

According to a preferred feature of the invention, the pocket is formed of a double wall of interlaced fibers constituting a rectangular pocket closed on four sides.

The spring housed in this closed pocket is therefore unable to escape from the protective sleeve.

This pocket is furthermore produced in the same structure as the remainder of the sleeve, with the result that its fabrication process remains relatively simple.

According to another preferred feature of the invention, the spring is a metal leaf spring adapted in an unstable equilibrium position to form a plane strip, and in a stable equilibrium position to form a spiral.

Thus the protective sleeve may take the form of a plane woven or knitted structure before it is fitted to a pipe.

When fitting this protective sleeve, it suffices to deform the leaf springs slightly so that, in a stable equilibrium position, they wrap around the pipe to close the protective sleeve by virtue of overlapping of these longitudinal edges.

Other features and advantages of the invention will become apparent in the course of the following description.

BRIEF DESCRIPTION OF THE DRAWINGS

In the appended drawings, provided by way of nonlimiting example:

FIG. 1 is a front view of one embodiment of a protective sleeve according to the invention;

FIG. 2 is a view of a protective sleeve in longitudinal section taken along the line II—II in FIG. 1;

FIGS. 3 and 4 are views of the protective sleeve in cross section taken along the lines III—III and IV—IV, respectively, in FIG. 1;

FIG. 7 depicts a method of fabricating a protective sleeve.

DETAILED DESCRIPTION OF THE INVENTION

Figure 5:
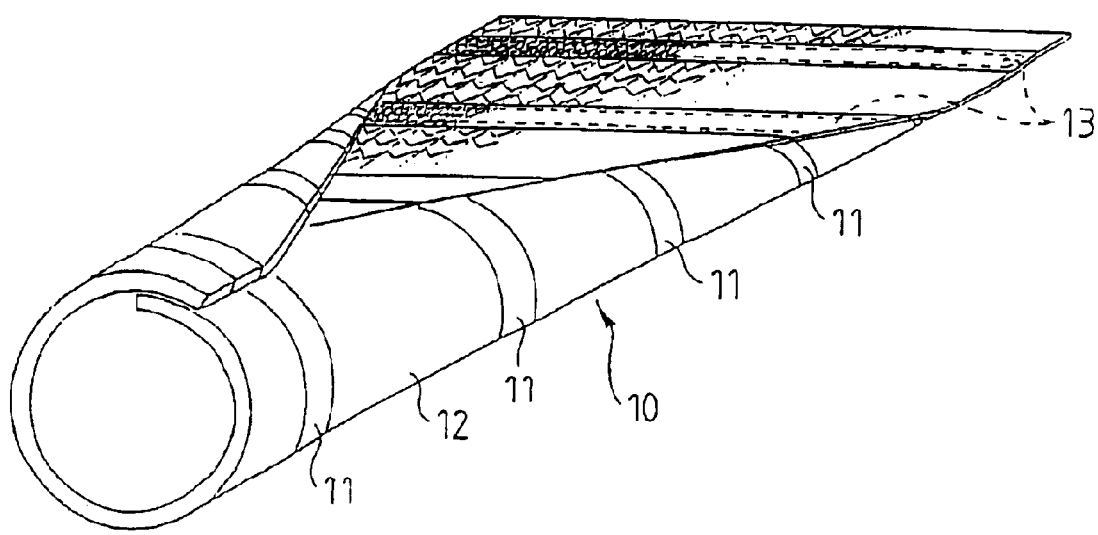
FIG. 5 depicts the principle of closure of the protective sleeve according to the invention.

A protective sleeve for a fluid circulation tube is described first with reference to FIGS. 1 to 4.

This type of protective sleeve is generally used for thermally insulating a metal pipe in which a fluid such as automobile vehicle exhaust gas flows.

As shown clearly in FIG. 1, the protective sleeve is made up of a strip 10 of interlaced fibers.

In this example the fibers are knitted. They could equally be woven or braided to form a strip by interlacing the fibers.

This strip 10 of fibers comprises at least one pocket 11 extending in the transverse direction of the strip.

In this example, the strip comprises a plurality of pockets 11 spaced from each other in the longitudinal direction of the strip 10.

In a nonlimiting manner, the pockets 11 may be equidistant from each other. They could equally be disposed along the strip 10 as a function of the shape of the pipe to be protected.

In particular, pockets 11 may be disposed in the vicinity of the ends of the protective sleeve or in portions of the protective sleeve intended to cover portions of the pipe that are bent or of irregular section, i.e. portions of the pipe in which the protective sleeve is strongly deformed in the longitudinal or radial direction.

Thus the pockets 11 are separated by portions of strip 12 that are also knitted.

Thus the strip 10 is knitted.

As shown in FIG. 3, the strip of interlaced fibers has exactly the same appearance on both faces 10a, 10b of the strip.

In this embodiment, as shown in FIG. 4, the pockets 11 are knitted with a tubular stocking stitch and the tape portions 12 between the pockets 11 are knitted with an interlock stitch. Other stitches may equally be used to produce the strip portions 12, and in particular a ribbing stitch or any other stitch producing exactly the same appearance on both faces 10a, 10b of the strip.

Thus the tubular stocking stitch pockets 11 between the strip portions 12 form a double wall 11a, 11b of knitted fibers to constitute a rectangular pocket 11 closed on all four sides.

Thus each pocket 11 is connected by a closed transverse edge to strip portions 12 situated in line with the pocket 11 and the lateral edges 11c of each pocket 11 are also closed.

The material from which the strip is made may consist of glass fibers, which are able to withstand temperatures of the order of 400 to 500° C. If the temperatures of the pipes to be protected are very much higher than this, for example greater than 1000° C., it is possible to use silica fibers. To limit the cost of this kind of protective sleeve made from silica fibers, it may be made from a mixture of glass fibers and silica fibers knitted so that the glass fibers are preferentially disposed on a first face of the strip 10, for example a face 10a, and the silica fibers are preferentially disposed on a second face of the strip 10, for example a face 10b.

When fitting the protective sleeve to the pipe, the second face 10b made from silica fibers is adapted to come into contact with the pipe to be protected and the other face 10a made from glass fibers forms the exterior face of the protective sleeve.

As shown in FIG. 2, a spring 13 is housed in each pocket 11.

In this example the spring 13 is a metal leaf spring, as shown clearly in FIG. 4.

This leaf spring has two equilibrium positions:
 an unstable equilibrium position, in which the metal spring assumes the shape of a plane strip, and
 a stable equilibrium position, in which the metal spring rolls up to form a spiral, the ends 13a, 13b of the spring 13 being adapted, in this spiral form, to overlap each other over a sector subtending an angle of the order of 90° C.

Figure 6:
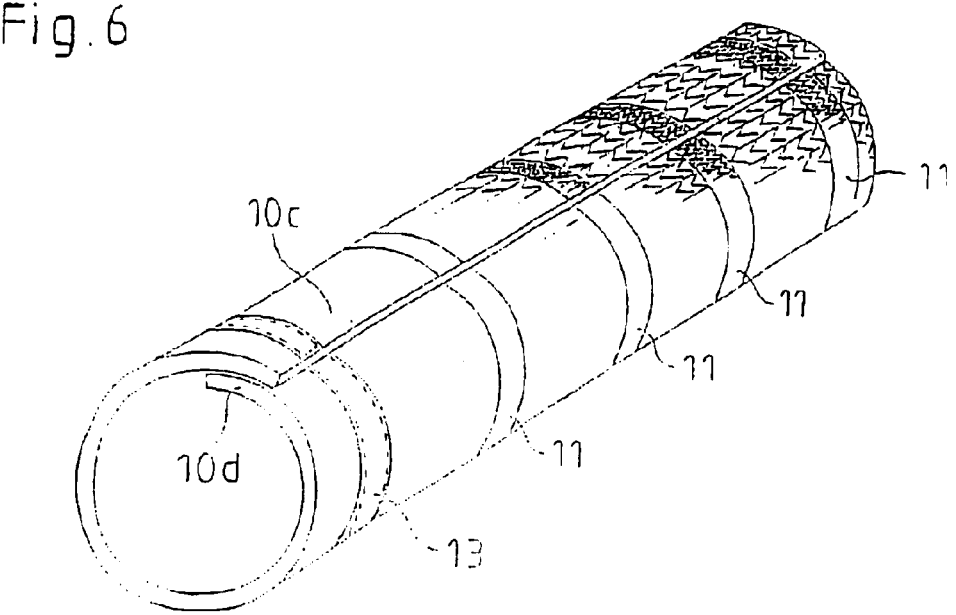
FIG. 6 depicts the protective sleeve in the closed position.

As shown clearly in FIGS. 5 and 6, the protective sleeve takes the form of a plane strip, the springs 13 being held in the same plane in an unstable equilibrium position.

It suffices to deform each of the springs 13 housed in the pockets 11 slightly to close the protective sleeve so that these longitudinal edges 10c, 10d overlap each other.

For example, the area of overlap of the longitudinal edges 10c, 10d of the closed protective sleeve may subtend an angle from 90° to 10° so that the cross section of the protective sleeve may be adapted to pipes with different sections.

Thanks to the springs 13 housed at various places on the protective sleeve, the protective sleeve is held closed by the springs 13 and secured to the pipe to be protected by the same springs 13.

This facilitates fitting the protective sleeve to a pipe compared to existing solutions and does not require the use of accessories for closing the protective sleeve and securing it to a pipe.

One embodiment of a method of manufacturing a protective sleeve as described above is described next with reference to FIG. 7.

In this example, the protective sleeve is knitted from fibers.

To obtain a protective sleeve as shown in FIG. 1, there are knitted:
 a strip portion 12 of fibers knitted with an interlock stitch, and
 an open pocket 11, in line with the strip portion 12, knitted with a tubular stocking stitch.

As soon as the pocket 11 is long enough to accommodate a spring 13, the latter is inserted into the pocket 11, as shown in FIG. 7.

The pocket 11 is then closed in the transverse direction of the strip 10 by knitting another strip portion 12 of fibers with an interlock stitch.

The above steps may be implemented recursively to form a plurality of pockets 11 in the strip 10.

In this example, thanks to the use of a tubular stocking stitch, the step of closing the lateral edges 11c of the pockets 11 is carried out simultaneously with the steps of knitting the pockets.

Of course, many modifications could be made to the embodiments described hereinabove.

In particular, the pockets 11 adapted to house the springs could also be produced from two walls 11a, 11b knitted separately and then connected along longitudinal edges 11c of each pocket in order to close them.

Moreover, the entirety of the strip and the pockets could be knitted in such a way as to keep at least one longitudinal edge 11c of each pocket 11 open and the springs 13 inserted into each pocket via one of these longitudinal edges 11c after knitting the whole of the strip. The longitudinal edge or edges 11c are then closed, for example sewn closed.

What is claimed is:

1. Protective sleeve for fluid circulation tubes compising a structure of interlaced fibers, wherein said structure is formed of a strip of interlaced fibers comprising at least one pocket extending in the transverse direction of the strip, and comprising glass fibers preferentially disposed on a first face of the strip and silica fibers preferentially disposed on a second face of the strip, and wherein a spring is housed in said pocket and adapted, in a stable equilibrium position, to hold said protective sleeve closed by virtue of overlapping of longitudinal edges of the strip.

2. The protective sleeve according to claim 1, wherein the sleeve comprises a plurality of pockets paced from each other in the longitudinal direction of the strip of interlaced fibers.

3. The protective sleeve according to claim 1, wherein the pocket is formed of a double wall of interlaced fibers constituting a rectangular pocket closed on four sides.

4. The protective sleeve according to claim 1, wherein the sleeve is formed of a strip of interlaced fibers of identical appearance on both faces of the strip.

5. The protective sleeve according to claim 1, wherein the sleeve is formed of a strip of knitted fibers.

6. The protective sleeve according to claim 1, wherein the pocket is knitted with a tubular stocking stitch.

7. The protective sleeve according to claim 1, wherein the spring is a metal leaf spring adapted in the stable equilibrium position to form a spiral.

8. The protective sleeve according to claim 7, wherein the metal leaf spring is adapted in a unstable equilibrium position to form a plane strip.

9. The protective sleeve according claim 2, wherein the pocket is formed of a double wall of interlaced fibers constituting a rectangular pocket closed on four sides.

10. Method of thermally protecting an automobile vehicle exhaust gas recirculation circuit pipe, which comprises the steps of:
 providing a protective sleeve according to claim 1; and
 fitting said protective sleeve around said exhaust gas recirculation circuit pipe.

11. The method according to claim 10, herein the fitting step comprises: spreading apart the longitudinal edges by applying a first force in a direction opposite to the elastic return force exerted by the spring, and then removing the first force so that the spring in its equilibrium position holds the longitudinal edges of the strip one over the other round the pipe.

* * * * *